US 10,994,414 B2

(12) United States Patent
Imai et al.

(10) Patent No.: US 10,994,414 B2
(45) Date of Patent: May 4, 2021

(54) CONTROL DEVICE AND ROBOT SYSTEM

(71) Applicant: Seiko Epson Corporation, Tokyo (JP)

(72) Inventors: Ryosuke Imai, Matsumoto (JP);
Masaki Motoyoshi, Azumino (JP)

(73) Assignee: Seiko Epson Corporation

( * ) Notice: Subject to any disclaimer, the term of this patent is extended or adjusted under 35 U.S.C. 154(b) by 460 days.

(21) Appl. No.: 16/003,333

(22) Filed: Jun. 8, 2018

(65) Prior Publication Data

US 2018/0354122 A1  Dec. 13, 2018

(30) Foreign Application Priority Data

Jun. 9, 2017  (JP) .............................. JP2017-114064

(51) Int. Cl.
| | |
|---|---|
| *G05B 19/04* | (2006.01) |
| *B25J 9/16* | (2006.01) |
| *B25J 13/06* | (2006.01) |
| *B25J 9/10* | (2006.01) |
| *B25J 3/04* | (2006.01) |
| *B25J 15/02* | (2006.01) |

(52) U.S. Cl.
CPC ................ *B25J 9/161* (2013.01); *B25J 3/04* (2013.01); *B25J 9/102* (2013.01); *B25J 9/1607* (2013.01); *B25J 9/1653* (2013.01); *B25J 13/06* (2013.01); *B25J 15/02* (2013.01)

(58) Field of Classification Search
CPC ..... B25J 13/06; B25J 15/02; B25J 3/04; B25J 9/102; B25J 9/1607; B25J 9/161; B25J 9/1653
See application file for complete search history.

(56) References Cited

U.S. PATENT DOCUMENTS

| | | | | |
|---|---|---|---|---|
| 2015/0276436 | A1* | 10/2015 | Hasebe ................. | B25J 13/088 |
| | | | | 74/490.03 |
| 2015/0328770 | A1 | 11/2015 | Motoyoshi et al. | |
| 2015/0360369 | A1* | 12/2015 | Ishikawa ............... | B25J 9/1674 |
| | | | | 29/428 |
| 2016/0008983 | A1* | 1/2016 | Osaka ................... | B25J 9/1628 |
| | | | | 700/254 |
| 2016/0365771 | A1* | 12/2016 | Kokubo ................ | H02K 7/116 |
| 2017/0007336 | A1* | 1/2017 | Tsuboi ....................... | B25J 9/06 |
| 2017/0371321 | A1 | 12/2017 | Motoyoshi et al. | |
| 2018/0361592 | A1* | 12/2018 | Motoyoshi .......... | B25J 17/0275 |
| 2019/0291284 | A1* | 9/2019 | Yoneda ................. | B25J 9/0009 |

FOREIGN PATENT DOCUMENTS

| | | |
|---|---|---|
| JP | 11-264448 A | 9/1999 |
| JP | 2013-146827 A | 8/2013 |
| JP | 2017-226045 A | 12/2017 |

* cited by examiner

*Primary Examiner* — Harry Y Oh (57) ABSTRACT

A control device for controlling a robot including an arm driven via a reduction gear by a motor generating a drive force, the control device comprising a processor that is configured to execute computer-executable instructions so as to control a robot, wherein the processor is configured to perform speed control on the arm by using an input detection value from an input position detection sensor which detects an input side operation position of the reduction gear, and an output detection value from an output position detection sensor which detects an output side operation position of the reduction gear.

14 Claims, 7 Drawing Sheets

CONTROL DEVICE AND ROBOT SYSTEM

BACKGROUND

1. Technical Field

The present invention relates to a technique for improving operation accuracy in a robot.

2. Related Art

In the related art, in a technical field of a robot, a wave reduction gear is used as a reduction gear. In principle, the wave reduction gear includes an angular transmission error. According to a technique disclosed in JP-A-11-264448 (Japanese Patent No. 4052490), based on characteristics of the angular transmission error of the wave reduction gear which has been previously identified, a position command in a reverse phase of the characteristics is given to the wave reduction gear, thereby suppressing vibrations caused by the angular transmission error of the wave reduction gear.

According to a technique disclosed in JP-A-2013-146827, a gyro sensor is disposed at a tip of an arm, and sensitivity of the gyro sensor is corrected, based on a difference between an angle detected by the gyro sensor and a rotation angle of a motor. As a result, a sensitivity error of the gyro sensor which is caused by torsion of the arm is reduced.

According to a method disclosed in JP-A-11-264448 (Japanese Patent No. 4052490), in order to suppress the vibrations caused by the angular transmission error of the wave reduction gear, the characteristics of the angular transmission error of the wave reduction gear need to be measured in advance. However, the characteristics of the angular transmission error vary depending on each solid body of the wave reduction gear. Consequently, a heavy burden is required when the above-described method is applied to the wave reduction gear during mass production.

The technique disclosed in JP-A-2013-146827 shows no consideration for a fact that a position of the arm is influenced by deflection (position error) of the reduction gear, which is one factor of the angular transmission errors.

SUMMARY

An advantage of some aspects of the invention is to solve at least a part of the problems described above, and the invention can be implemented as the following forms or application examples.

(1) According to an aspect of the present disclosure, a control device for controlling a robot including a movable unit driven via a transmission unit by a drive unit generating a drive force is provided. The control device includes a control unit that performs speed control on the movable unit by using an input detection value output from an input position detection sensor which detects an input side operation position of the transmission unit, and an output detection value output from an output position detection sensor which detects an output side operation position of the transmission unit.

According to this aspect, it is possible to accurately perform the speed control on the movable unit in view of a position error occurring in the transmission unit, based on the input detection value and the output detection value. As a result, compared to an aspect in which the speed control is not performed using the output detection value, it is possible to more accurately control the position of the movable unit up to a higher speed range. The error of the individual transmission unit does not need to be measured in advance.

(2) In the control device according to the above-described aspect, a detection period of the output side operation position detected by the output position detection sensor may be longer than a detection period of the input side operation position detected by the input position detection sensor. The control unit may perform the speed control on the movable unit by using a difference between a delay input detection value obtained by delaying the input detection value and the output detection value. According to this aspect, even in a case where there is a deviation between the detection period used by the output position detection sensor and the detection period used by the input position detection sensor, it is possible to more properly calculate the position error occurring in the transmission unit, and it is possible to stably perform the speed control on the movable unit.

(3) In the control device according to the above-described aspect, the control unit may include a low pass filter to which the difference between the delay input detection value and the output detection value is input. The control unit may perform the speed control on the movable unit by using an output of the low pass filter. The characteristics of the transmission unit include a spring component in some cases. If the speed control is performed using the difference between the delay input detection value and the output detection value of the transmission unit without any change, there is a possibility that oscillation may occur. However, according to the above-described aspect, a high frequency component in the difference between the delay input detection value and the output detection value is eliminated by the low pass filter. Therefore, it is possible to stably perform the speed control on the movable unit.

(4) In the control device according to the above-described aspect, the output position detection sensor may include an imaging unit capable of imaging the movable unit. The output position detection sensor may detect the output side operation position of the transmission unit, based on the captured image. According to this aspect, the output side operation position of the transmission unit can be obtained by effectively using the imaging unit which can be versatility used in controlling the robot.

(5) In the control device according to the above-described aspect, the output position detection sensor may detect an angular position of an output shaft of the transmission unit which transmits a rotary motion as an output. According to this aspect, compared to an aspect in which a position of a configuration driven by the output shaft is detected, it is possible to detect the output side operation position on which the characteristics of the transmission unit are more accurately reflected.

(6) In the control device according to the above-described aspect, a force detection unit capable of detecting an externally applied force may be disposed in the movable unit. The control unit may perform the speed control on the movable unit by using an output of the force detection unit. According to this aspect, the speed control can be more accurately performed on the movable unit in view of information relating to deflection of the movable unit which is obtained based on the force detected by the force detection unit.

(7) In the control device according to the above-described aspect, the transmission unit includes a reduction gear. In some cases, the reduction gear includes an output position error which is specific to the reduction gear. According to the above-described aspect, it is possible to perform the speed control on the movable unit so as to reduce the output position error which is specific to the transmission unit.

(8) According to another aspect of the present disclosure, a robot controlled by the above-described control device is provided.

(9) According to still another aspect of the present disclosure, a robot system including the above-described control device and the robot controlled by the control device is provided.

A plurality of configuration elements belonging to each aspect according to the present disclosure described above are not all indispensable. In order to partially or entirely solve the above-described problems, or in order to partially or entirely achieve advantageous effects described herein, some configuration elements in the plurality of configuration elements can be appropriately modified, deleted, and substituted with other new configuration elements. Restricted content for the configuration elements can be partially deleted. In order to partially or entire solve the above-described problems, or in order to partially or entirely achieve advantageous effects described herein, technical features included in one aspect according to the present disclosure described above can be partially or entirely combined with technical features included in the other aspect according to the present disclosure described above so as to form another independent aspect according to the present disclosure.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A1. Configuration of Robot System

Figure 1:
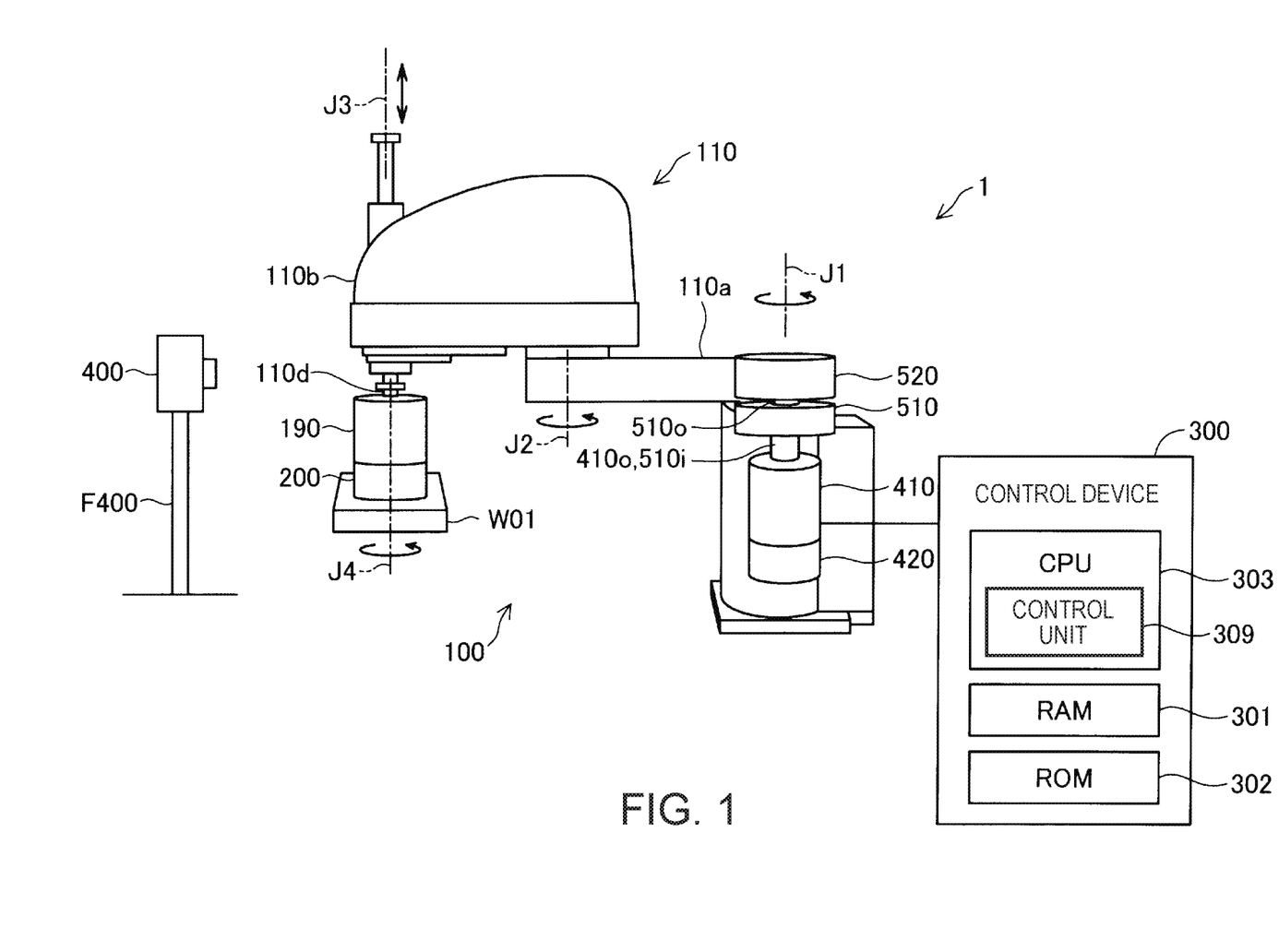
FIG. 1 is a schematic view for describing a robot system according to an embodiment.

FIG. 1 is a schematic view for describing a robot system 1 according to the present embodiment. The robot system 1 according to the present embodiment includes a robot 100, an end effector 200, a control device 300, and a camera 400.

The robot 100 is a four-axis robot having an arm 110 including four joints J1 to J4. The joints J1, J2, and J4 are torsional joints. The joint J3 is a linear motion joint. A configuration element between the joints configuring the arm 110 is referred to as an "arm element" in the description herein. In FIG. 1, in a plurality of arm elements included in the arm 110, an arm element 110a between the joint J1 and the joint J2, an arm element 110b between the joint J2 and the joint J3, and an arm element 110d configuring a tip of the arm 110 are illustrated with the reference numerals.

The robot 100 uses a servomotor so that each of the four joints J1 to J4 is rotated or moved straight. In this manner, an end effector 200 attached to a tip portion of the arm 110 can be located at a designated position in a three-dimensional space while adopting a designated posture. A point indicating a position of the end effector 200 in the three-dimensional space is referred to as a tool center point (TCP).

In the robot 100, each joint includes a servomotor 410, a reduction gear 510, a motor angle sensor 420, and an output side angle sensor 520. In FIG. 1, in order to facilitate the understanding of the technique, the servomotor 410, the reduction gear 510, the motor angle sensor 420, and the output side angle sensor 520 are schematically illustrated only for the joint J1.

The servomotor 410 generates a drive force by using a current supplied from the control device 300. More specifically, the servomotor 410 rotates an output shaft 410o thereof by using the current supplied from the control device 300.

The motor angle sensor 420 detects an angular position Pm of the output shaft 410o of the servomotor 410. The motor angle sensor 420 is a rotary encoder. The angular position Pm of the output shaft 410o which is detected by the motor angle sensor 420 is transmitted to the control device 300.

The reduction gear 510 includes an input shaft 510i and the output shaft 510o. The reduction gear 510 converts a rotation input for the input shaft 510i into a rotation output having lower rotational speed than the rotation input, and outputs the rotation output from the output shaft 510o. Specifically, the reduction gear 510 is a wave reduction gear.

The input shaft 510i of the reduction gear 510 is connected to the output shaft 410o of the servomotor 410. An angular position of the input shaft 510i is equal to the angular position Pm of the output shaft 410o of the servomotor 410. Therefore, the motor angle sensor 420, which can detect the angular position Pm of the output shaft 410o of the servomotor 410, detects the angular position of the input shaft 510i of the reduction gear 510.

With respect to a continuous constant input from the output shaft 410o of the servomotor 410, the reduction gear 510 generates a periodic transmission error. That is, with respect to the rotation input having continuous constant speed from the output shaft 410o of the servomotor 410, the rotation speed and the angular position of the output shaft 510o of the reduction gear 510 include a periodic deviation.

The arm element 110a is fixed to the output shaft 510o of the reduction gear 510 of the joint J1. As a result, the arm element 110a is rotated in the joint J1 via the reduction gear 510 by the rotation of the output shaft 410o of the servomotor 410.

The output side angle sensor 520 is located inside the arm element 110a. The output side angle sensor 520 detects an angular position Pro of the output shaft 510o of the reduction gear 510. That is, whereas the motor angle sensor 420 detects the input side operation position Pm of the reduction gear 510, the output side angle sensor 520 detects the output side operation position Pro of the reduction gear 510.

In the description herein, in the transmission unit (reduction gear 510 according to the present embodiment) transmitting a drive force, an operation position of a member (input shaft 510i according to the present embodiment) receiving the input drive force is described as an "input side operation position". In the transmission unit transmitting the drive force, an operation position of a member (output shaft 510o according to the present embodiment) transmitting the output drive force to the other configuration is described as an "output side operation position".

Specifically, the output side angle sensor 520 is an imaging type rotary encoder using a camera. The output side angle sensor 520 is an encoder capable of detecting an absolute angular position. Specifically, in the output side angle sensor 520, codes different from each other are recorded at the respective angular positions of disks rotated in response to the rotation of an object. In the output side angle sensor 520, these codes are read by the camera, and are recognized through image processing. In this manner, the absolute angular position is detected. Therefore, the output of the output side angle sensor 520 includes a time delay relative to an actual angular position of the output shaft 510o.

A detection period of the output side operation position detected by the output side angle sensor 520 is longer than a detection period of the input side operation position detected by the motor angle sensor 420. The output of the motor angle sensor 420 does not include a time delay as much as the output of the output side angle sensor 520, relative to the angular position of the input shaft 510i of the reduction gear 510. The angular position Pro of the output shaft 510o which is detected by the output side angle sensor 520 is transmitted to the control device 300.

The rotary encoder which detects the angular position Pro of the output shaft 510o in the reduction gear 510 is provided. Accordingly, compared to an aspect of measuring an operation position of a further downstream side configuration (for example, a tip side position from the joint J1 in the arm element 110a) driven by the output of the reduction gear 510, the output position of the reduction gear 510 can be more accurately detected.

The robot 100 includes a force sensor 190 at the tip of the arm 110. The end effector 200 is attached to the arm 110 of the robot 100 via the force sensor 190. The force sensor 190 can measure forces acting in three axial directions of an X-axis, a Y-axis and a Z-axis, which are applied from the outside, that is, which are applied from configurations other than the force sensor 190, and can measure torques around the X-axis, the Y-axis, and the Z-axis. Therefore, the force sensor 190 can measure the forces in the three axial directions of the X-axis, the Y-axis, and the Z-axis, which act on the end effector 200, and the torques around the X-axis, the Y-axis, and the Z-axis. The output of the force sensor 190 is transmitted to the control device 300, and is used for controlling the robot 100.

The control device 300 controls the robot 100. The control device 300 is connected to the robot 100. The control device 300 includes a computer including a RAM 301, a ROM 302, and a CPU 303. The CPU 303 loads a computer program stored in the ROM 302 into the RAM 301, thereby executing the computer program so as to realize various functions (to be described later). A functional unit of the CPU 303 of the control device 300 controlling the robot 100 is illustrated in FIG. 1 as a "control unit 309".

The end effector 200 is attached to the tip of the arm 110. Under the control of the control device 300, the end effector 200 can grip a workpiece W01, and can release the gripped workpiece W01. As a result, for example, under the control of the control device 300, the robot 100 and the end effector 200 can be moved while gripping the workpiece W01 serving as a work target. In FIG. 1, in order to facilitate the understanding of the technique, the end effector 200 is illustrated using a simple cylinder.

The camera 400 can capture a photographic image including the workpiece W01, the periphery of the workpiece W01, and the arm 110. The image generated by the camera 400 is transmitted to the control device 300, and is used for controlling the robot 100. The camera 400 is supported by a fulcrum F400.

A2. Control of Robot

Hereinafter, the control unit 309 (refer to the lower right in FIG. 1) of the control device 300 according to the present embodiment and control units 309ca to 309cc of the control device 300 according to Comparative Examples 1 to 3 will be described. In order to facilitate the understanding of the technique, the control units 309ca to 309cc of the control device 300 according to Comparative Examples 1 to 3 will be first described. Thereafter, the control unit 309 of the control device 300 according to the present embodiment will be described. A robot controlled by the control units 309ca to 309cc according to Comparative Examples 1 to 3 is the robot 100 illustrated in FIG. 1. A configuration of the control device 300 other than the control units 309ca to 309cc according to Comparative Examples 1 to 3 is the same as a configuration of the control device 300 according to the present embodiment.

Hereinafter, control of one joint J1 (refer to FIG. 1) which is performed by the control unit 309 or the control units 309ca to 309cc will be described. However, in actual, the control unit 309 according to the present embodiment, and the control units 309ca to 309cc according to Comparative Examples 1 to 3 can control the respective joints J1 to J4 of the robot 100.

Figure 2:
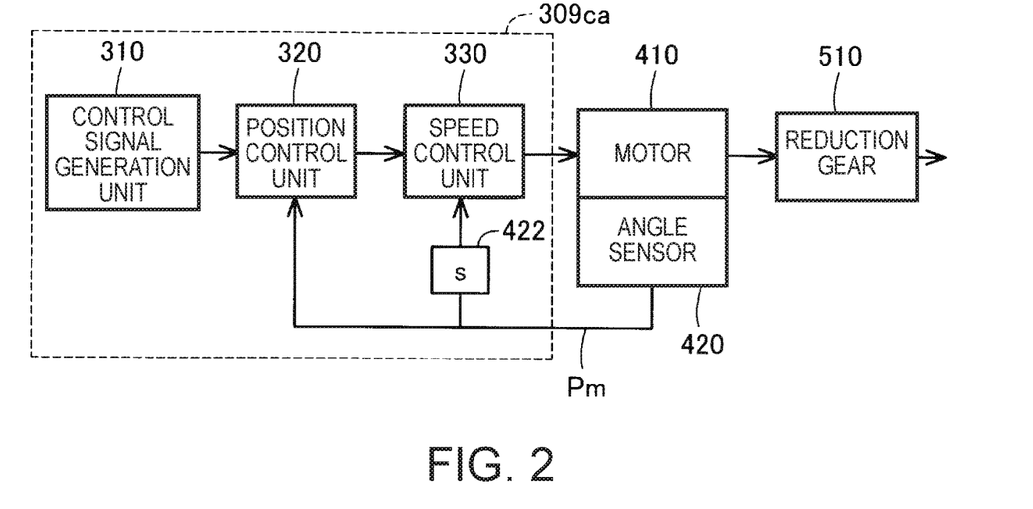
FIG. 2 is a block diagram illustrating a relationship among a configuration element of a control unit according to Comparative Example 1, and a servomotor, a motor angle sensor, and a reduction gear which are included in a robot.

FIG. 2 is a block diagram illustrating a relationship among a configuration element of a control unit 309ca according to Comparative Example 1, and the servomotor 410, the motor angle sensor 420, and the reduction gear 510 which are included in the robot 100. Here, in order to facilitate the understanding of the technique, the control in accordance with the output of the force sensor 190 and the camera 400 will be omitted in the description. The control for both of these will be described later.

The control unit 309ca according to Comparative Example 1 includes a control signal generation unit 310, a position control unit 320, and a speed control unit 330.

The control signal generation unit 310 generates a position control signal indicating a target position where the arm 110 has to be located, and outputs the position control signal to the position control unit 320.

The position control unit 320 receives the position control signal from the control signal generation unit 310. The position control unit 320 receives the angular position Pm of the servomotor 410 from the motor angle sensor 420 of the robot 100, as a position feedback. Based on the information, the position control unit 320 generates a speed control signal of the servomotor 410 of the robot 100, and outputs the speed control signal to the speed control unit 330.

The speed control unit 330 receives the speed control signal from the position control unit 320. The speed control unit 330 receives a signal obtained by differentiating the angular position Pm of the servomotor 410 which is output from the motor angle sensor 420, as the speed feedback, that is, a signal of the rotation speed. In FIG. 2, a block indicating differentiation of the angular position is indicated by a block 422 marked with "S". The speed control unit 330 generates and outputs a torque control signal, based on the speed control signal from the position control unit 320 and the rotational speed of the servomotor 410. Thereafter, based on the torque control signal, a magnitude of a current supplied to the servomotor 410 is determined, and the current having the determined magnitude is supplied to the servomotor 410.

The servomotor 410 is supplied with the current, and outputs the drive force to the reduction gear 510. The reduction gear 510 reduces the rotational speed of the drive force received from the servomotor 410. The reduction gear 510 causes the arm element 110a to perform the rotary motion around the output shaft 510o by using the reduced drive force (refer to FIG. 1).

In Comparative Example 1, the angular position Pm of the servomotor 410 is fed back from the motor angle sensor 420 to the position control unit 320. Angular velocity of the servomotor 410 is fed back from the motor angle sensor 420 to the speed control unit 330. Therefore, according to Comparative Example 1, it is possible to accurately control the position of the arm element 110a compared to an aspect without having the feedback.

In Comparative Example 1, the angular position of the arm element 110a serving as a control target, that is, the angular position itself of the output shaft 510o of the reduction gear 510 is not used for the position feedback. The control performed in Comparative Example 1 is called "semi-closed control".

Figure 3:
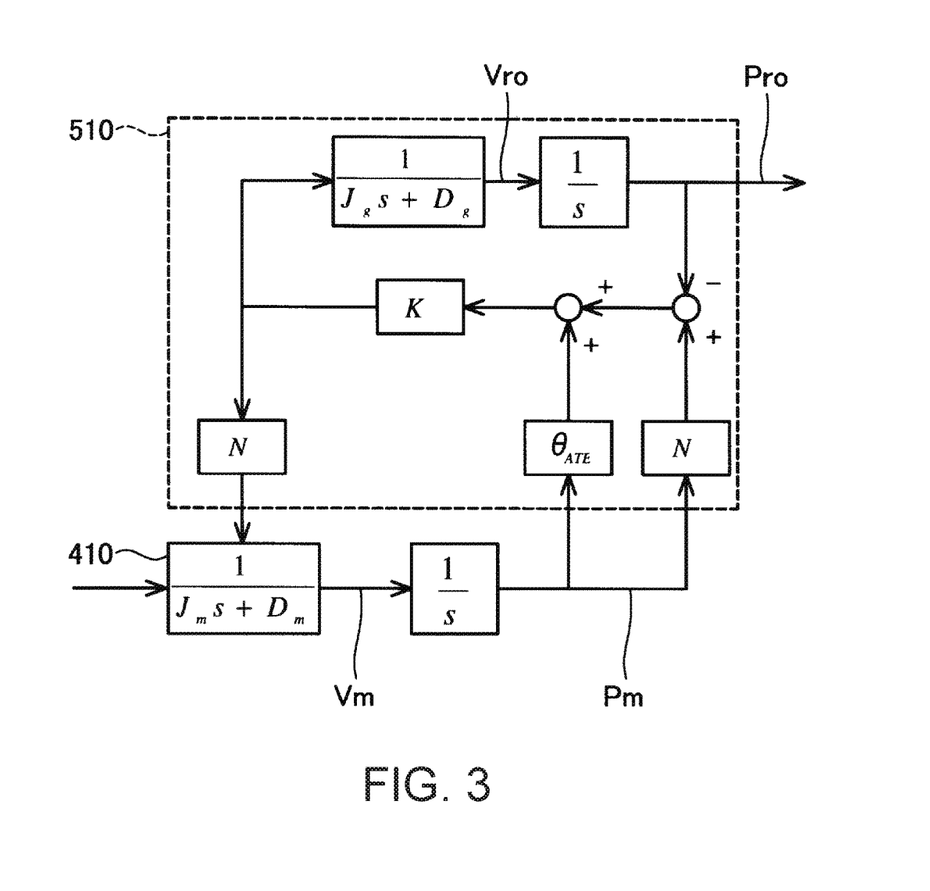
FIG. 3 is a block diagram illustrating a control model of the servomotor and the reduction gear.

FIG. 3 is a block diagram illustrating a control model of the servomotor 410 and the reduction gear 510. In FIG. 3, each reference numeral represents the following content.

Jm: Motor Inertia
Dm: Motor Viscosity Coefficient
N: Reduction Ratio of Reduction Gear
K: Spring Constant of Reduction Gear
Jg: Reduction Gear Inertia
Dg: Reduction Gear Viscosity Coefficient
$\theta_{ATE}$: Angular Transmission Error
Vm: Rotational Speed of Motor
Vro: Rotational Speed of Output Shaft 510o of Reduction Gear 510

The reduction gear 510 represented by the control model as illustrated in FIG. 3 generates a periodic angular transmission error $\theta_{ATE}$. The angular transmission error $\theta_{ATE}$ can be approximated by Equation (1) below.

$$\theta_{ATE} = -A \times \sin(2 \times \theta m + \Delta\theta) \quad (1)$$

A: Amplitude
θm: Angular Position of Input Shaft (Angular Position of Servomotor 410)
Δθ: Phase Deviation In Equation (1), the angular position θm of the input shaft is doubled for the following reason. That is, in the wave reduction gear, due to the principle, the angular transmission error $\theta_{ATE}$ is changed as much as one period while the input shaft is rotated half. That is, while the input shaft is rotated one round, the angular transmission error $\theta_{ATE}$ is changed as much as two periods. Therefore, in Equation (1), the angular position θm of the input shaft is doubled.

As described above, the control unit 309ca according to Comparative Example 1 does not receive the feedback of the output of the reduction gear 510. Therefore, the vibrations or the position deviation of the arm element 110a which are caused by the angular transmission error $\theta_{ATE}$ occurring in the reduction gear 510 cannot be solved.

Figure 4:
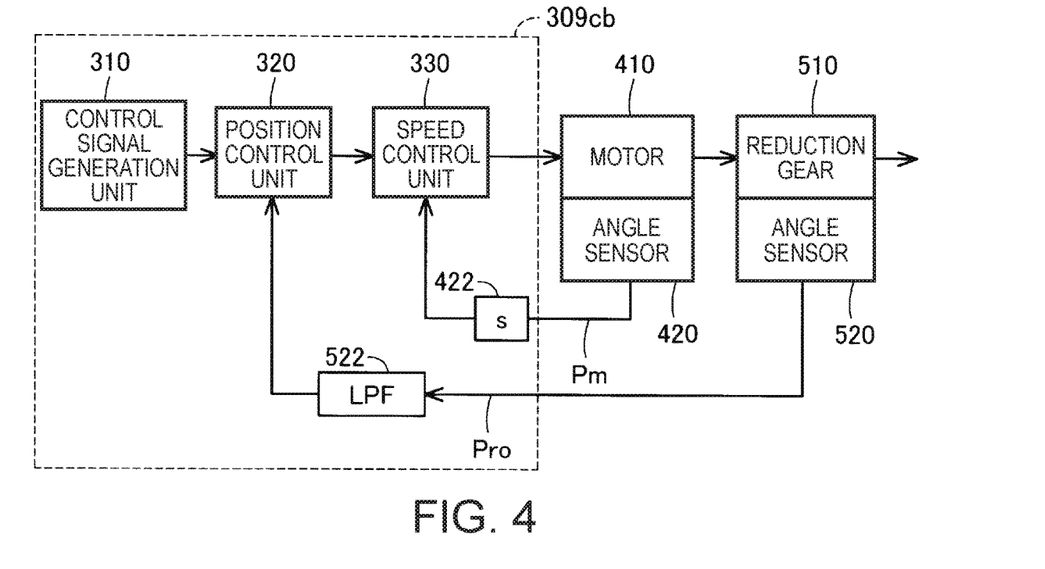
FIG. 4 is a block diagram illustrating a relationship among a configuration element of a control unit according to Comparative Example 2, and the servomotor, the motor angle sensor, the reduction gear, and an output side angle sensor which are included in the robot.

FIG. 4 is a block diagram illustrating a relationship among a configuration element of a control unit 309cb according to Comparative Example 2, and the servomotor 410, the motor angle sensor 420, the reduction gear 510, and the output side angle sensor 520 which are included in the robot 100. The control unit 309cb according to Comparative Example 2 includes a low pass filter 522 to which the angular position Pro of the output shaft 510o of the reduction gear 510 is input from the output side angle sensor 520 of the robot 100. In the inputs, the low pass filter 522 outputs only a frequency component lower than that of a resonance frequency of the reduction gear 510.

In the control unit 309cb according to Comparative Example 2, as the position feedback, the position control unit 320 receives the angular position configured to include the low frequency component in the angular position Pro of the output shaft 510o of the reduction gear 510 from the low pass filter 522. The position control unit 320 generates the speed control signal of the servomotor 410 of the robot 100, based on the angular position configured to include the low frequency component in the angular position Pro of the output shaft 510o of the reduction gear 510 and the position control signal output from the control signal generation unit 310. On the other hand, the angular position Pm of the servomotor 410 which is the output of the motor angle sensor 420 or a differential value thereof is not fed back to the speed control unit 330.

Other points of the control unit 309cb according to Comparative Example 2 are the same as those of the control unit 309ca according to Comparative Example 1.

In Comparative Example 2, the angular position Pro of the output shaft 510o of the reduction gear 510 is fed back from the output side angle sensor 520 to the position control unit 320. Therefore, according to Comparative Example 2, it is possible to perform control to reduce the vibrations or the position deviation of the arm element 110a caused by the angular transmission error $\theta_{ATE}$ (refer to FIG. 3) of the reduction gear 510. Therefore, according to Comparative Example 2, it is possible to more accurately control the position of the arm element 110a, compared to Comparative Example 1. Therefore, according to the control unit 309cb of Comparative Example 2, even in continuous path control (CP control) which is control for operating the robot in accordance with a predetermined movement route, the end effector can be accurately moved on the set movement route.

In Comparative Example 2, the angular position Pro of the output shaft 510o of the reduction gear 510 is fed back to the position control unit 320 via the low pass filter 522. That is, the output of the low pass filter 522 is used so as to perform speed control on the arm element 110a. Therefore, even if the angular position Pro of the output shaft 510o of the reduction gear 510 (refer to FIG. 3) including a spring component K is fed back to the position control unit 320, the vibrations are not generated, and the speed control and the position control can be stably performed on the arm element 110a.

In Comparative Example 2, the angular position Pro of the output shaft 510o of the reduction gear 510 serving as a control target is used for the position feedback. The control performed in Comparative Example 2 is called "fully closed control".

Figure 5:
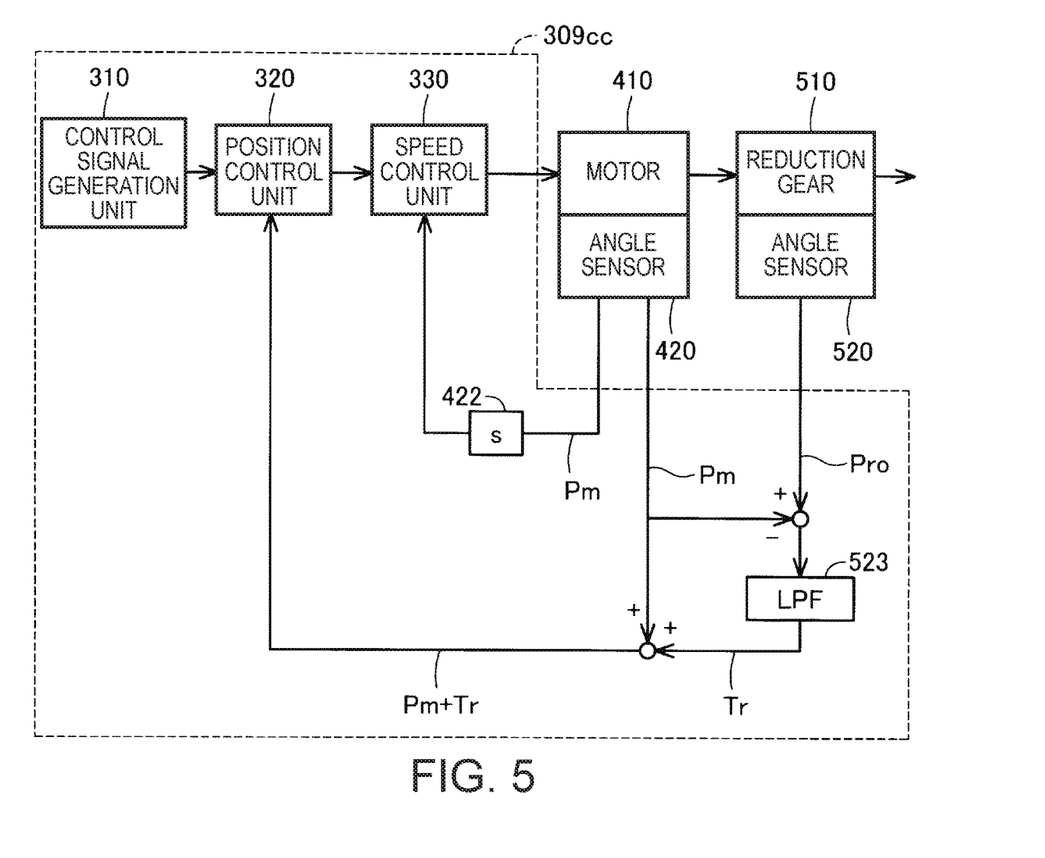
FIG. 5 is a block diagram illustrating a relationship among a configuration element of a control unit according to Comparative Example 3, and the servomotor, the motor angle sensor, the reduction gear, and the output side angle sensor which are included in the robot.

FIG. 5 is a block diagram illustrating a relationship among a configuration element of a control unit 309cc according to Comparative Example 3, and the servomotor 410, the motor angle sensor 420, the reduction gear 510, and the output side angle sensor 520 which are included in the robot 100. The control unit 309cc according to Comparative Example 3 includes a low pass filter 523 to which a difference between the angular position Pm of the servomotor 410 and the angular position Pro of the output shaft 510o of the reduction gear 510. In the inputs, the low pass filter 523 outputs only the frequency component lower than that of the resonance frequency of the reduction gear 510. A configuration of the low pass filter 523 is the same as that of the low pass filter 522. An output (that is, an angle configured to include the low frequency component in the difference between the angular position Pm of the servomotor 410 and the angular position Pro of the output shaft 510o of the reduction gear 510) Tr of the low pass filter 523 roughly represents a torsion amount (position error) between the input and the output in the reduction gear 510.

In the control unit 309cc according to Comparative Example 3, as the position feedback, the position control unit 320 receives a signal to which the output Tr (that is, the torsion amount in the reduction gear 510) output from the low pass filter 522 and the angular position Pm of the servomotor 410 are added. The position control unit 320 generates the speed control signal of the servomotor 410 of the robot 100, based on the signal and the position control signal output from the control signal generation unit 310.

Other points of the control unit 309cc according to Comparative Example 3 are the same as those of the control unit 309cb according to Comparative Example 2.

In Comparative Example 3, the angular position Pm of the servomotor 410 which is not the output side of the reduction gear 510 but the angular position on the input side is fed back from the motor angle sensor 420 to the position control unit 320 (refer to FIGS. 5 and 4). Therefore, according to Comparative Example 3, it is possible to reduce the vibrations or the position deviation of the arm element 110a up to a higher speed range, compared to Comparative Example 2. That is, according to Comparative Example 3, compared to Comparative Example 2, a wider band is available, and stable control can be performed up to the higher speed range.

In Comparative Example 3, an angle Tr (torsion amount in the reduction gear 510) configured to include the low frequency component in the difference between the angular position Pm of the servomotor 410 and the angular position Pro of the output shaft 510o of the reduction gear 510 is fed back to the position control unit 320. Therefore, according to Comparative Example 3, it is possible to perform control to reduce the vibrations or the position deviation of the arm element 110a caused by the angular transmission error $\theta_{ATE}$ of the reduction gear 510. That is, according to Comparative Example 3, compared to Comparative Example 1, it is possible to more accurately control the position of the arm element 110a.

In Comparative Example 3, the angular position Pro of the output shaft 510o of the reduction gear 510 serving as a control target is used for the position feedback. The angular position Pm of the input shaft 510i of the reduction gear 510 is used for the speed feedback. The control performed in Comparative Example 3 is called "hybrid control".

Figure 6:
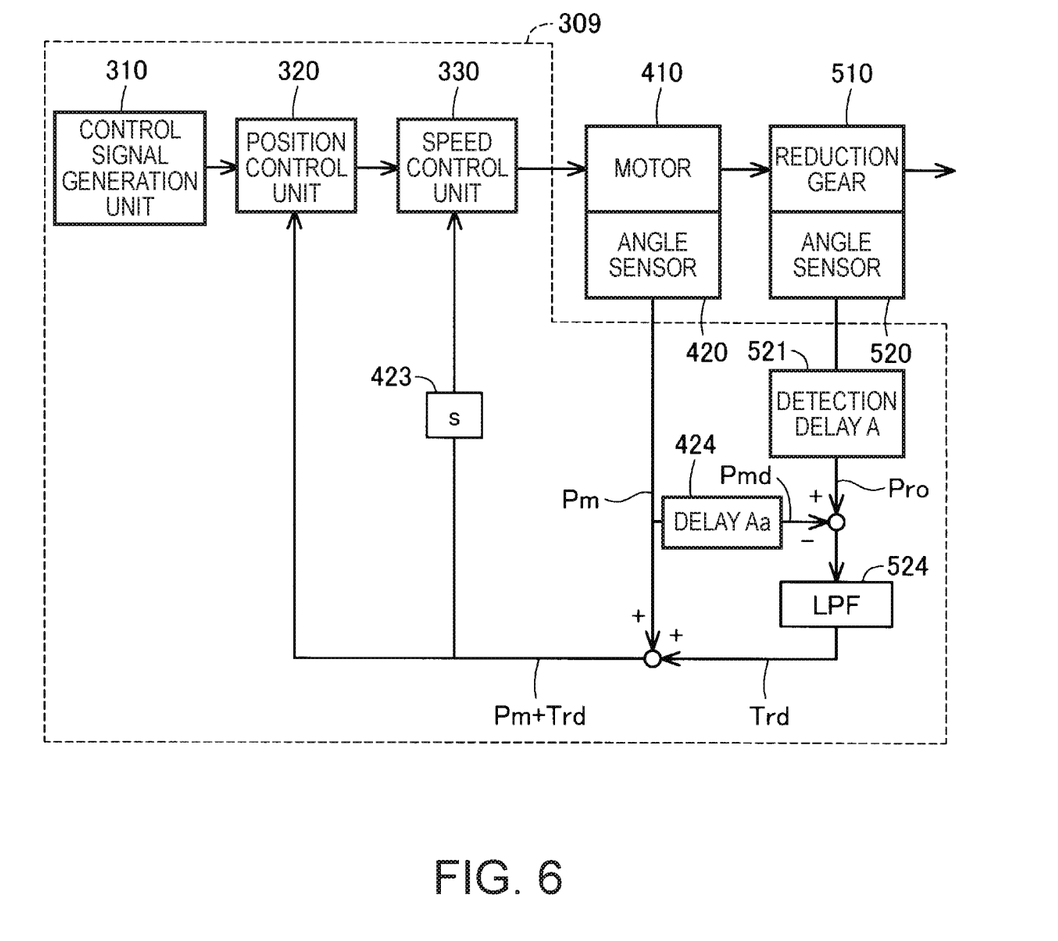
FIG. 6 is a block diagram illustrating a relationship among a configuration element of a control unit according to a first embodiment, and the servomotor, the motor angle sensor, the reduction gear, and the output side angle sensor which are included in the robot.

FIG. 6 is a block diagram illustrating a relationship among a configuration element of a control unit 309 according to the first embodiment, and the servomotor 410, the motor angle sensor 420, the reduction gear 510, and the output side angle sensor 520 which are included in the robot 100. The control unit 309 according to the present embodiment includes a delay detection block 521 which detects a delay amount A of the angular position Pro of the output shaft 510o of the reduction gear 510 with respect to the angular position Pm of the servomotor 410. The control unit 309 according to the present embodiment includes a delay block 424 which delays the angular position Pm of the servomotor 410 as much as a delay amount Aa based on the delay amount A detected by the delay detection block 521 so as to generate a delay angular position Pmd. As a result, the delay block 424 reduces or eliminates a deviation between the detection timing of the angular position Pm of the servomotor 410 and the detection timing of the angular position Pro of the output shaft 510o of the reduction gear 510.

A configuration element of the control unit 309 according to the present embodiment further includes a low pass filter 524 to which a difference between the delay angular position Pmd of the delayed servomotor 410 and the angular position Pro of the output shaft 510o of the reduction gear 510 is input. In the inputs, the low pass filter 524 outputs only the frequency component lower than that of the resonance frequency of the reduction gear 510. A configuration of the low pass filter 524 is the same as that of the low pass filters 522 and 523. An output (that is, an angle configured to include the low frequency component in the difference between the delay angular position Pmd of the servomotor 410 adjusted so that the detection timings coincide with each other and the angular position Pro of the output shaft 510o of the reduction gear 510) Trd of the low pass filter 524 represents a torsion amount in the reduction gear 510.

In the control unit 309 according to the present embodiment, as the position feedback, the position control unit 320 receives a signal to which the output Trd (that is, the torsion amount in the reduction gear 510) output from the low pass filter 524 and the angular position Pm of the servomotor 410 are added. The position control unit 320 generates the speed control signal of the servomotor 410 of the robot 100, based on the signal and the position control signal output from the control signal generation unit 310.

In the control unit 309 according to the present embodiment, as the speed feedback, the speed control unit 330 receives a signal obtained by differentiating a signal to which the output Trd (that is, the torsion amount in the reduction gear 510) output from the low pass filter 524 and the angular position Pm of the servomotor 410 are added. In FIG. 6, a block representing this differentiation is illustrated using a block 423 marked with "S". The speed control unit 330 generates the torque control signal of the servomotor 410 of the robot 100, based on the signal and the speed control signal output from the position control unit 320.

Other points of the control unit 309 according to the present embodiment are the same as those of the control unit 309cc according to Comparative Example 3.

According to the present embodiment, a difference (position error occurring in the reduction gear 510) between the delay angular position Pmd of the servomotor 410 and the angular position Pro of the output shaft 510o of the reduction gear 510 is fed back to the speed control unit 330. Therefore, according to the present embodiment, compared to Comparative Example 3 in which the position error occurring in the reduction gear 510 is not fed back to the speed control unit 330, it is possible to properly perform control to reduce the vibrations or the position deviation of the arm element 110a caused by the angular transmission error $\theta_{ATE}$ of the reduction gear 510 up to a higher speed range. That is, according to the present embodiment, compared to Comparative Example 3, a wider band is available, and stable control can be performed up to the higher speed range.

According to the present embodiment, a difference between the delay angular position Pmd of the servomotor 410 whose detection timing is adjusted and the angular position Pro of the output shaft 510o of the reduction gear 510 is used for the feedback to the speed control unit 330. That is, the control unit 309 uses a difference between the delay angular position Pmd obtained by delaying the angular position Pm of the input shaft 510i and the angular position Pro of the output shaft 510o of the reduction gear 510 so as to perform speed control on the arm element 110a (refer to the speed control unit 330 in FIG. 6). Therefore, according to the present embodiment, even in a case where there is a deviation between the detection period used by the output side angle sensor 520 and the detection period used by the motor angle sensor 420, the position error occurring in the reduction gear 510 is properly calculated. In this manner, compared to Comparative Example 3, it is possible to properly reduce the vibrations or the position deviation of the arm element 110a up to a higher speed range. That is, according to the present embodiment, compared to Comparative Example 3, a wider band is available.

Furthermore, according to the present embodiment, the feedback of the angular position Pm of the input shaft 510i of the reduction gear 510 to the position control unit 320 and the speed control unit 330, delay is not delayed by the delay block 424 (refer to FIG. 6). Therefore, it is possible to reduce the vibrations or the position deviation of the arm element 110a up to a higher speed range.

Figure 7:
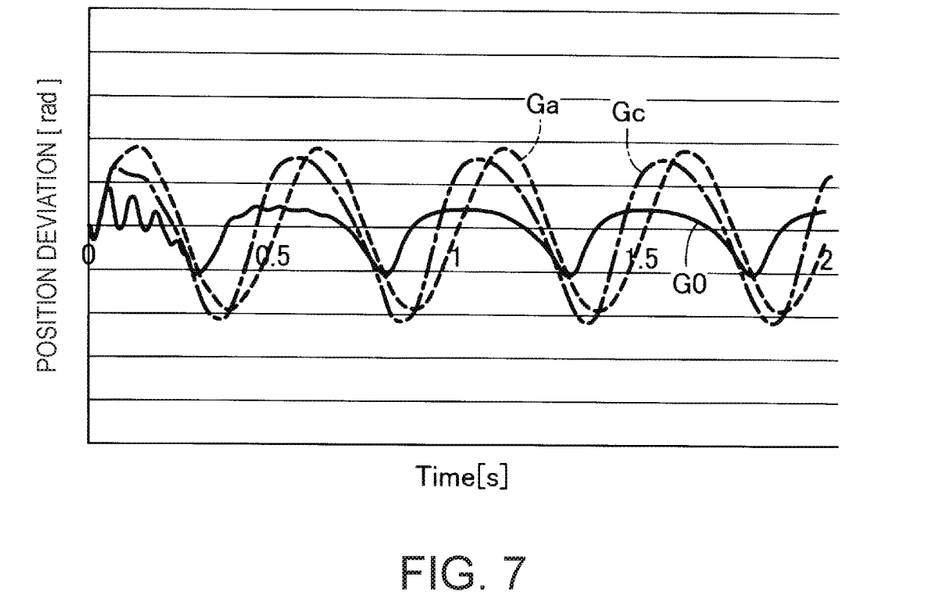
FIG. 7 is a graph illustrating position deviation of an output shaft of the reduction gear in a case where control is performed using the control units according to the present embodiment, Comparative Example 1, and Comparative Example 3.

FIG. 7 is a graph illustrating a position deviation of the output shaft 510o of the reduction gear 510 in a case where control is performed by the control units 309, 309ca, and 309cc according to the present embodiment, Comparative Example 1, and Comparative Example 3. A graph Ga represents a position deviation of the output shaft 510o in a case of adopting the control unit 309ca (refer to FIG. 2) according to Comparative Example 1. A graph Gc represents a position deviation of the output shaft 510o in a case of adopting the control unit 309cc (refer to FIG. 5) according to Comparative Example 3. A graph G0 represents a position deviation of the output shaft 510o in a case of adopting the control unit 309 (refer to FIG. 6) according to the present embodiment. Conditions other than different points of the control performed by the control units 309, 309ca, and 309cc according to the present embodiment, Comparative Example 1, and Comparative Example 3 which are described with reference to FIGS. 2, 5, and 6 are all unified, and the position deviations are measured.

Referring to FIG. 7, in a case of the deviations of the control unit 309ca according to Comparative Example 1, the control unit 309cc according to Comparative Example 3, and the control unit 309 according to the present embodiment, the periods of the position deviation are substantially the same as each other. However, a size of the position deviation is the smallest in the control unit 309 according to the present embodiment. The position deviation of the control unit 309cc according to Comparative Example 3 is the second smallest, and the position deviation of the control unit 309ca according to Comparative Example 1 is the largest.

Figure 8:
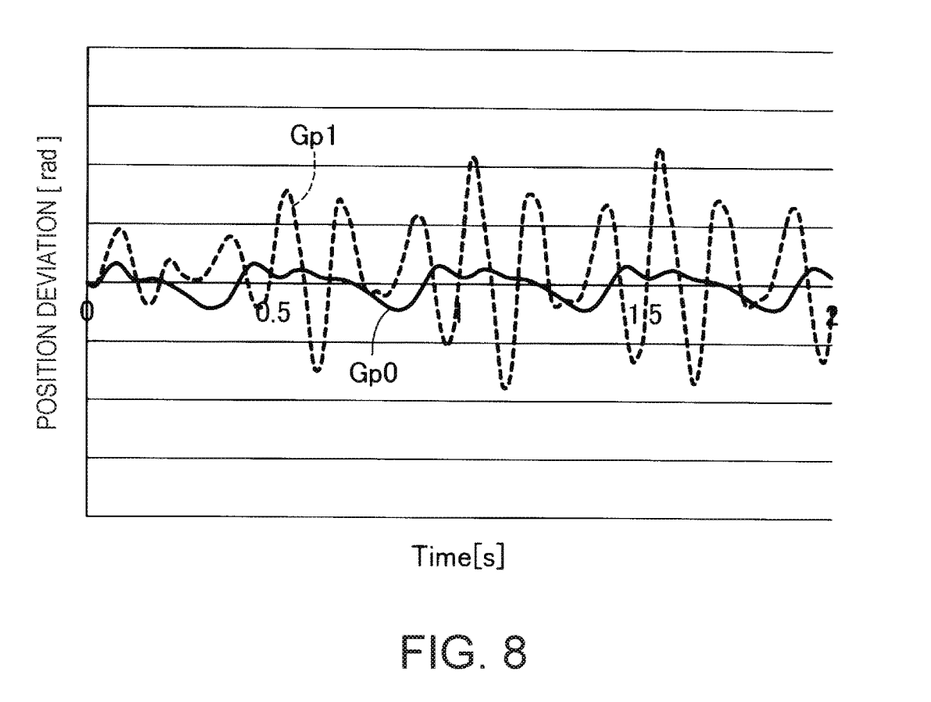
FIG. 8 is a graph illustrating position deviation of the output shaft of the reduction gear in a case where a delay block is stopped to function and in a case where the delay block is allowed to function, in the control unit according to the present embodiment.

FIG. 8 is a graph illustrating the position deviation of the output shaft 510o of the reduction gear 510 in a case where the delay block 424 (refer to FIG. 6) is stopped to function in the control unit 309 according to the present embodiment and in a case where the delay block 424 is allowed to function. A graph Gp1 represents the position deviation of the output shaft 510o in the case where the delay block 424 is stopped to function. A graph Gp0 represents the position deviation of the output shaft 510o in the case where the delay block 424 is allowed to function. However, a scale on the vertical axis in FIG. 8 is different from a scale on the vertical axis in FIG. 7.

As can be understood from FIG. 8, compared to the case where the delay block 424 is stopped to function, an amplitude decreases and the control is further stabilized in the case where the delay block 424 is allowed to function.

As described above, the control device 300 according to the present embodiment includes the control unit 309 which performs the speed control on the reduction gear 510 by using an input detection value Pm output from the motor angle sensor 420 for detecting the operation position of the input shaft 510i of the reduction gear 510, and an output detection value Pro output from the output side angle sensor 520 for detecting the operation position of the output shaft 510o of the reduction gear 510 (refer to the input detection value Pm, output detection value Pro, and the speed control unit 330 in FIG. 6). Therefore, based on the input detection value Pm and the output detection value Pro, the speed control can be accurately performed on the reduction gear 510 in view of the position error occurring in the reduction gear 510. As a result, compared to Comparative Examples 1 to 3 (refer to FIGS. 2, 4, and 5) in which the speed control is not performed using the output detection value Pro, it is possible to accurately control the position of the arm element 110a up to a higher speed range. Therefore, according to the control device 300 of the present embodiment, even in the continuous path control (CP control), the end effector can be accurately moved on the movement route. It is possible to accurately control the position of the arm element 110a without individually measuring the error of the reduction gear 510 of each robot in advance.

In the description herein, a case where "the speed control is performed on O by using X" includes not only an aspect in which the speed control is performed on O by directly using X (for example, refer to Pro in FIG. 6), but also a case where the speed control is performed on O by using information obtained through predetermined processing of X (for example, refer to "Pm+Trd" and 423 in FIG. 6).

The servomotor 410 according to the present embodiment is called the "drive unit". The reduction gear 510 is called the "transmission unit". The arm element 110a is called the "movable unit". The motor angle sensor 420 is called the "input position detection sensor". The angular position Pm of the output shaft 410o of the servomotor 410 is called the "input detection value". The output side angle sensor 520 is called the "output position detection sensor". The angular position Pro of the output shaft 510o of the reduction gear 510 is called the "output detection value". The delay angular position Pmd is called the "delay input detection value". The camera 400 is called the imaging unit".

B. Second Embodiment

Figure 9:
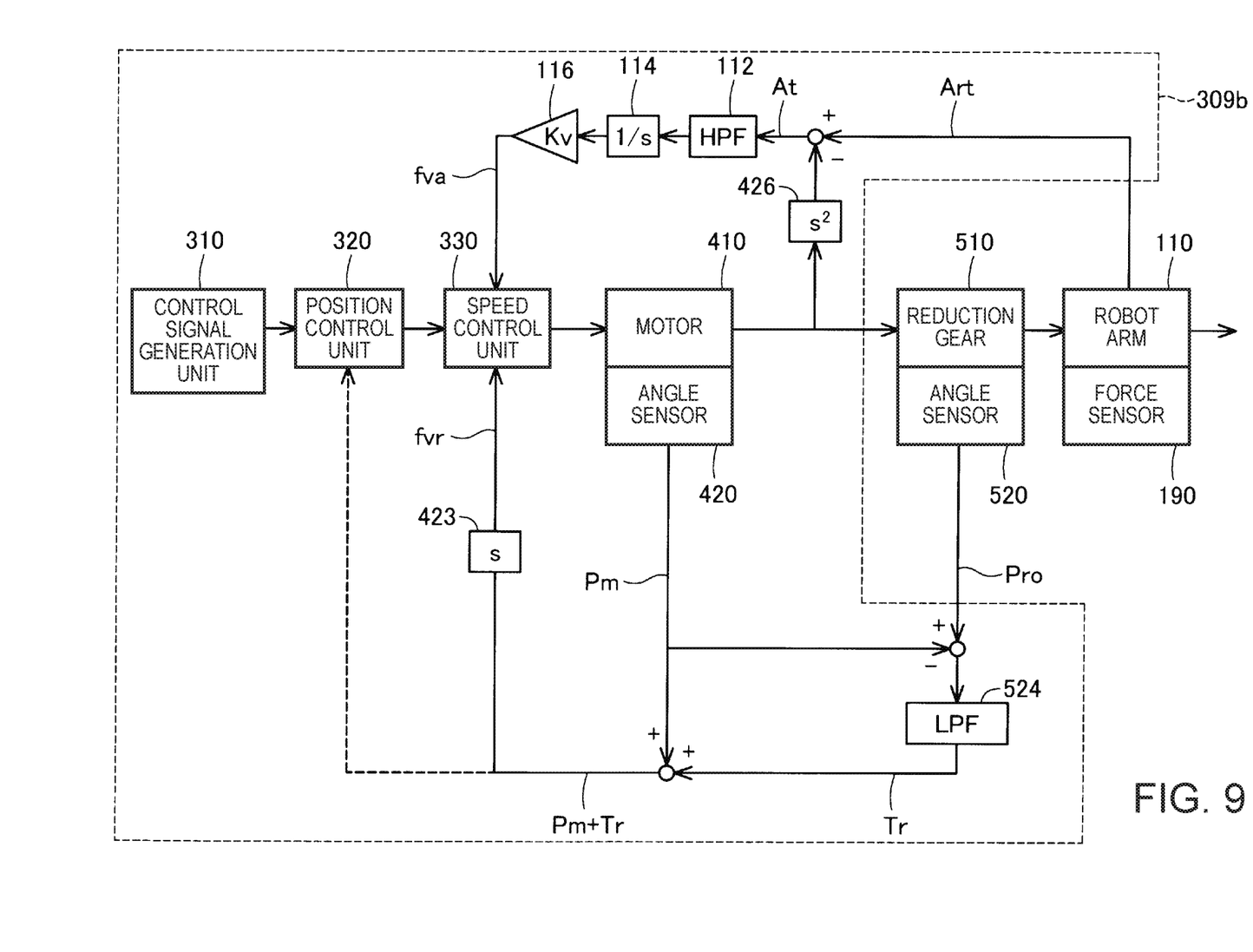
FIG. 9 is a block diagram illustrating a relationship among a configuration element of a control unit according to a second embodiment, and the servomotor, the motor angle sensor, the reduction gear, the output side angle sensor, and a force sensor which are included in the robot.

FIG. 9 is a block diagram illustrating a relationship among a configuration element of a control unit 309b according to a second embodiment, and the servomotor 410, the motor angle sensor 420, the reduction gear 510, the output side angle sensor 520, the arm 110, and the force sensor 190 which are included in the robot 100. The control unit 309b according to the second embodiment does not include the delay detection block 521 and the delay block 424 which are included in the control unit 309 according to the first embodiment (refer to FIG. 6). According to the second embodiment, a difference between the angular position Pro of the output shaft 510o of the reduction gear 510 and the angular position Pm of the input shaft 510i of the reduction gear 510 is not used for the position control (in FIG. 9, the corresponding feedback portion is illustrated using a broken line arrow).

According to the second embodiment, the output of the force sensor 190 (refer to FIG. 1) is used for the speed control. Angular acceleration Art around the joint J1 is obtained from the torques around the X-axis, the Y-axis, and the Z-axis which act on the end effector 200 detected by the force sensor 190 and the mass of the end effector 200 and the workpiece W01. The control unit 309b according to the second embodiment includes a high pass filter 112 whose input value is a difference between a value obtained by performing second differentiation on the angular position Pm of the input shaft 510i of the reduction gear 510 and the angular acceleration Art of the tip of the arm 110. In FIG. 9, a block representing the second differentiation of the angular position is illustrated using a block 426 marked with "S2". The difference between the value obtained by performing the second differentiation on the angular position Pm of the input shaft 510i and the angular acceleration Art of the tip of the arm 110 of the reduction gear 510 represents a change (torsional acceleration) of the acceleration which is caused by deflection of the arm 110. In the inputs, the high pass filter 112 outputs only the frequency component higher than the predetermined resonance frequency.

As a speed feedback fva, the speed control unit 330 receives a value obtained by further multiplying a value obtained by integrating the output from the high pass filter 112 as much as a gain Kv times. In FIG. 9, a block representing the integration of the angular position is illustrated using a block 114 marked with "1/S". A block representing processing of the Kv times is illustrated using a block 116 marked with "Kv".

The speed feedback fva is performed via the high pass filter 112. In this manner, the speed feedback can be performed by removing an offset deviation caused by the integration (refer to an integral block 114 in FIG. 9). The value obtained by multiplying the gain Kv times is set to the speed feedback fva. In this manner, it is possible to adjust a correction amount for suppressing the vibrations caused by the torsion of the arm 110 to be a proper value.

As the speed feedback fvr, the speed control unit 330 receives a signal obtained by differentiating a signal to which the output Trd (that is, the torsion amount in the reduction gear 510) output from the low pass filter 524 and the angular position Pm of the servomotor 410. The speed feedback fva obtained via the high pass filter 112 represents an acceleration change (torsional acceleration) caused by the deflection of the arm 110. In contrast, the speed feedback fvr obtained via the low pass filter 524 represents the torsion amount between the input and the output in the reduction gear 510.

Other points of the control unit 309b according to the present embodiment are the same as those of the control unit 309 according to the first embodiment.

According to the present embodiment, the speed control unit 330 performs the speed control, based on the speed feedback fva representing the acceleration change (torsional acceleration) caused by the deflection of the arm 110 and the speed feedback fvr representing the torsion amount between the input and the output in the reduction gear 510. Therefore, in view of both the deflection of the arm 110 and the torsion of the reduction gear 510, it is possible to accurately perform the speed control on the arm element 110a.

Figure 10:
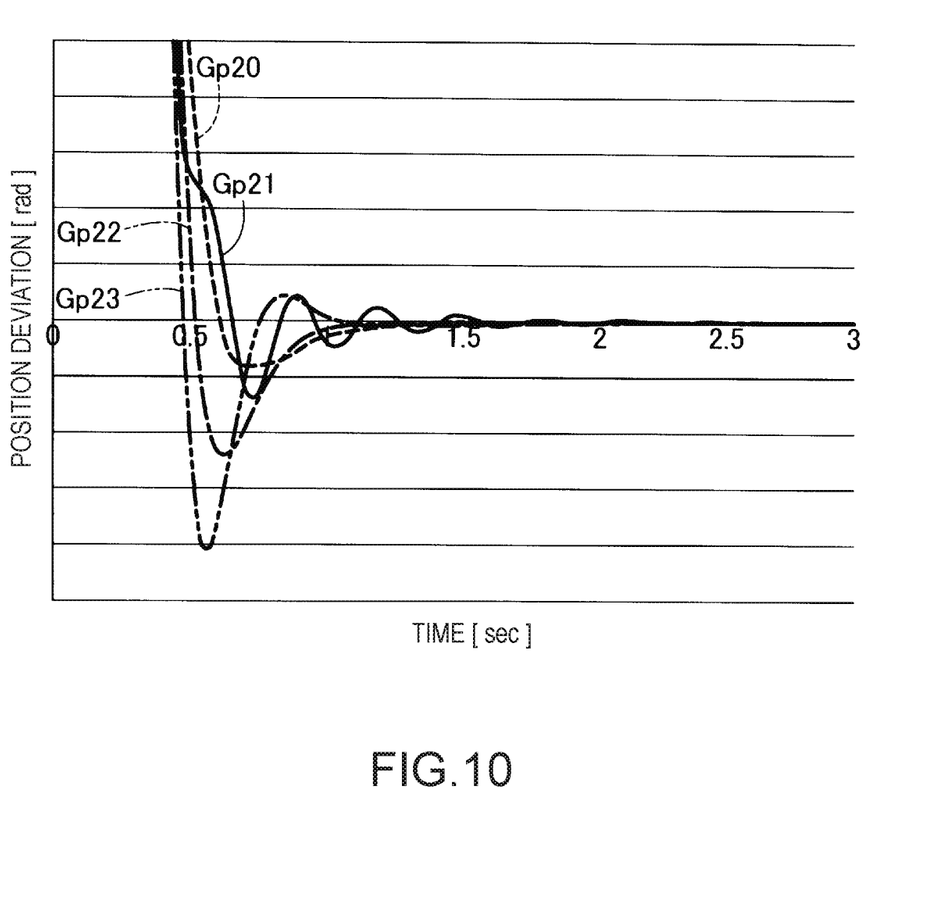
FIG. 10 is a graph illustrating an effect of speed feedback indicating an acceleration change caused by deflection of an arm in the control unit according to the present embodiment and speed feedback indicating a torsion amount between an input and an output in the reduction gear.

FIG. 10 is a graph illustrating an effect of the speed feedback fva representing the acceleration change (torsional acceleration) caused by the deflection of the arm 110 in the control unit 309b according to the present embodiment and the speed feedback fvr representing the torsion amount between the input and the output in the reduction gear 510. A graph G20 represents the position deviation of the output shaft 510o in a case where the control is performed by the control unit 309b (refer to FIG. 9) according to the present embodiment.

In FIG. 10, a graph G21 represents the position deviation of the output shaft 510o in a case where the control unit 309b according to the present embodiment does not perform the control for the speed feedback fva (refer to FIG. 9) representing the acceleration change caused by the deflection of the arm 110 and performs the control for the speed feedback fvr representing the torsion amount between that the input and output in the reduction gear 510. A graph G22 represents the position deviation of the output shaft 510o in a case of controlling for the speed feedback fva (refer to FIG. 9) representing the acceleration change caused by the deflection of the arm 110 according to Comparative Example 1 (refer to FIG. 2). A graph G23 represents the position deviation of the output shaft 510o in a case of controlling according to Comparative Example 1 (refer to FIG. 2).

Referring to FIG. 10, it is understood that the position deviation (graph G20) of the output shaft 510o is the smallest in a case where the control unit 309b according to the present embodiment performs the control. It is understood that the position deviation (graph G21) in a case where the control unit 309b according to the present embodiment performs the control so as not to perform the speed feedback fva is the next smallest. It is understood that the position deviation (graph G22) in a case of performing the control so as to perform the speed feedback fva (refer to FIG. 9) according to Comparative Example 1 (refer to FIG. 2) is the third smallest. It is understood that the position deviation (graph G23) in a case of controlling according to Comparative Example 1 (refer to FIG. 2) is the largest.

That is, through the comparison between the graph G20 and the graph G21 in FIG. 10 and the comparison between the graph G22 and the graph G23, it is understood that it is effective to perform the speed feedback fva (refer to FIG. 9) representing the acceleration change caused by the deflection of the arm 110. Through the comparison between the graph G21 and the graph G23 in FIG. 10, it is understood that it is effective to perform the speed feedback fvr (refer to FIG. 9) representing the torsion amount between the input and the output in the reduction gear 510.

The force sensor 190 according to the present embodiment is called the "force detection unit". As described above, in the description herein, the case where the speed control is performed on O by using X" includes not only an aspect in which the speed control is performed on O by directly using X (for example, refer to Art in FIG. 9), but also a case where the speed control is performed on O by using information obtained through predetermined processing of X (for example, refer to fva in FIG. 9).

C. Other Embodiments

C1. Other Embodiment 1:

(1) In the above-described embodiments, the drive unit is the servomotor 410. However, the drive unit can adopt an aspect other than the servomotor. For example, the drive unit can be a motor whose output is a rotary motion. The drive unit may be a linear motor or a cylinder whose output is a linear motion.

(2) In the above-described embodiments, the output position detection sensor is the imaging type rotary encoder serving as the output side angle sensor 520. However, other configurations can be adopted as the output position detection sensor for detecting the output side operation position of the transmission unit. In a case where the movable unit is rotated, an optical rotary encoder, a resolver, a potentiometer can be adopted as the output position detection sensor. In a case where the movable unit is linearly moved, the potentiometer or a linear encoder can be adopted as the output position detection sensor. These sensors may be capable of detecting an absolute position, or may not be capable of detecting an absolute position, and may be capable of detecting a relative position.

(3) In the above-described embodiments, the input detection value is the optical rotary encoder serving as the motor angle sensor 420. However, other configurations can be adopted as the input position detection sensor for detecting the input side operation position of the transmission unit. In a case where the drive unit outputs the rotational force, the resolver or the potentiometer can be adopted as the input position detection sensor. In a case where the drive unit outputs the drive force with a linear motion, the potentiometer or the linear encoder can be adopted as the input position detection sensor. These sensors may be capable of detecting an absolute position, or may not be capable of detecting an absolute position, and may be capable of detecting a relative position.

(4) In the above-described first embodiment, the input shaft 510$i$ of the reduction gear 510 is connected to the output shaft 410$o$ of the servomotor 410, and the angular position of the output shaft 410$o$ of the servomotor 410 and the angular position of the input shaft 510$i$ of reduction gear 510 are equal to each other (refer to 410$o$ and 510$i$ in FIG. 1). However, a mechanism for changing the rotational speed, such as other gear mechanisms, belts, and pulleys, may be disposed between the drive unit for generating the drive force and the transmission unit. If a reduction ratio is set as Np and the angular position of the output shaft of the drive unit is set as θo in this mechanism, an angular position θ of the input shaft of the reduction gear is obtained as θ=Np×θo.

(5) In the above-described first embodiment, the motor angle sensor 420 serving as the first input position detection sensor detects the angular position of the output shaft 410$o$ of the servomotor 410 as the first drive unit (refer to FIG. 1). However, the first input position detection sensor for detecting the input side operation position of the transmission unit may measure the input of the transmission unit.

(6) In the above-described second embodiment, the output detection value Pro of the output side angle sensor 520 is not used for the position control. However, the output detection value output from the output position detection sensor for detecting the output side operation position of the transmission unit can be used for the position control (refer to a broken line arrow input to the position control unit 320 in FIG. 9).

(7) In the above-described first embodiment, the control device 300 is provided as a configuration separate from the robot 100 (refer to FIG. 1). However, the control device can be provided in a form integrated with the robot. The control device can adopt an aspect in which the control device is provided separately from the robot and is connected to the robot in a wired or wireless manner.

In the above-described embodiments, a configuration realized by hardware may be partially substituted with software. Reversely, a configuration realized by software may be partially substituted with hardware. For example, in the above-described embodiments, a CPU serving as the control unit 309 reads and executes a computer program, thereby realizing various functions. However, functions realized by the control unit may be partially or entirely realized by a hardware circuit. The control unit can be configured to serve as a processor for realizing certain processing.

C2. Other Embodiment 2:

(1) In the above-described second embodiment, the control unit 309$b$ does not include the delay detection block 521 and the delay block 424 which are included in the control unit 309 according to the first embodiment (refer to FIGS. 6 and 9). However, in the second embodiment, it is possible to adopt an aspect in which the speed control is performed on the movable unit by using a difference between the delay input detection value obtained by delaying the input detection value and the output detection value.

(2) In the first embodiment, an aspect can be adopted which does not include the delay detection block 521 and the delay block 424 (refer to FIG. 6). In a case where the detection period of the output side operation position detected by the output position detection sensor and the detection period of the input side operation position detected by the input position detection sensor are substantially equal to each other, the speed control can be performed on the movable unit without delaying the input detection value and by using a difference between the input detection value and the output detection value.

C3. Other Embodiment 3:

In the above-described embodiments, the control unit 309 includes the low pass filter 524 which outputs only the frequency component lower than that of the resonance frequency of the reduction gear 510 in the inputs. However, a frequency region which is allowed to pass through the low pass filter may be other frequency regions. For example, an aspect can be adopted in which the low pass filter outputs a portion including a portion of the resonance frequency of the transmission unit in the inputs. The control unit may perform the speed control on the movable unit without providing the low pass filter and by using a difference between the input detection value delayed if necessary and the output detection value.

C4. Other Embodiment 4:

In the above-described embodiments, the output position detection sensor is the optical rotary encoder serving as the output side angle sensor 520. However, various sensors other than the output side angle sensor 520 can be used as the output position detection sensor for detecting the output side operation position of the transmission unit. For example, as the output position detection sensor, it is possible to adopt an inertial measurement unit (IMU) capable of detecting acceleration and angular velocity in the X, Y, and Z-axis directions. As the output position detection sensor, it is possible to adopt a laser displacement meter capable of detecting the output side operation position of the transmission unit, or the camera 400 (refer to FIG. 1). A sensor attached to a measurement target at the time of measurement may be a sensor incorporated in advance in a device, or may be a sensor attached to the device for measurement.

For example, in a case where the output position detection sensor includes the imaging unit (refer to the camera 400 in FIG. 1) such as a digital camera capable of imaging the movable unit, the output side operation position Pro of the transmission unit can be detected, based on the captured image. According to this aspect, it is possible to obtain the output side operation position of the transmission unit by effectively utilizing the imaging unit which can be used for various applications such as tracking control in controlling the robot.

C5. Other Embodiment 5:

In the above-described first embodiment, the output side angle sensor 520 detects the angular position of the output shaft 510o of the reduction gear 510 serving as the transmission unit. However, the output position detection sensor for detecting the output side operation position of the transmission unit may measure the output of the transmission unit, or may measure an operation position of a downstream configuration driven by the output of the transmission unit. For example, as a configuration for measuring the operation position of the downstream configuration driven by the output of the transmission unit, an inertial sensor may be used which is disposed in the downstream configuration driven by the output of the transmission unit so as to be capable of detecting acceleration in a predetermined direction.

C6. Other Embodiment 6:

In the above-described second embodiment, as the force detection unit, the force sensor is used which can measure the forces acting on the end effector 200 in the three axial directions of the X-axis, the Y-axis, and the Z-axis, which are orthogonal to each other, and the torques around the X-axis, the Y-axis, and the Z-axis (refer to the force sensor 190 in FIGS. 1 and 9). However, as the force detection unit, it is possible to use a force sensor which can measure the force in one axis direction, or a force sensor which can measure the forces in two directions of the X-axis and the Y-axis, which are orthogonal to each other, and the torques around the X-axis and the Y-axis. An aspect can be adopted in which the speed control is performed on the movable unit without using the force detection unit.

In the description herein, an example where "O is disposed in X" is not limited to a case where O is disposed inside X or a case where O is directly attached to X. The example includes a case where O (for example, the force sensor 190 in FIG. 1) is directly attached to X (for example, the arm element 110a in FIG. 1) or is attached to the other member (for example, the arm element 110d in FIG. 1) attached to the joint.

C7. Other Embodiment 7:

In the above-described embodiments, the transmission unit for transmitting the drive force is the reduction gear 510. However, the transmission unit serving as a target of reducing the transmission error may be configured so that the rotational speed is converted into a high rotation output by a rotation input, or may be configured so that the rotation input and the rotation output substantially coincide with each other.

More specifically, the transmission unit can adopt a belt, a pulley, and a gear mechanism, or a coupler. The belt and pulley, and the gear mechanism may be configured so that the rotational speed is converted into the high rotation output by the rotation input, may be configured so that the rotation input is converted into the rotation output whose rotational speed is low, or may be configured so that the rotation input and the rotation output substantially coincide with each other.

C8. Other Embodiment 8:

(1) In the above-described second embodiment, the present disclosure has been described by using the four-axis robot as an example (refer to FIG. 1). However, the present disclosure is applicable to a six-axis robot or a robot including other numbers of the joints. However, it is preferable that the present disclosure is applied to a device including the transmission unit for transmitting the drive force to the joint.

(2) In the above-described embodiments, the present disclosure has been described by using the robot as an example. However, the technique disclosed in the description herein is not limited to the robot, and is applicable to various machines such as printers and projectors, whose physical states are changed by performing the control via the transmission unit for transmitting the drive force. For example, if the technique disclosed in the description herein is applied to an operation of a printing head of the printers or an operation of transporting a printing medium, it is possible to improve the accuracy of the relative position between the head and the printing medium.

C9. Other Embodiment 9:

The present disclosure is not limited to the above-described embodiments, and can be realized by adopting various configurations within the scope not departing from the gist of the present disclosure. For example, in order to partially or entirely solve the above-described problems, or in order to partially or entirely achieve the above-described advantageous effects, technical features in the embodiments corresponding to technical features in the respective embodiments described in the summary of the invention can be appropriately substituted or combined with each other. Unless the technical features are described as essential in the description herein, the technical features can be appropriately deleted.

The entire disclosure of Japanese Patent Application No. 2017-114064, filed Jun. 9, 2017 is expressly incorporated by reference herein.

What is claimed is:

1. A control device for controlling a robot including an arm driven via a reduction gear by a motor generating a drive force, the control device comprising:
   a processor configured to execute computer-executable instructions so as to control a robot,
   wherein the processor is configured to perform speed control on the arm by using an input detection value from an input position detection sensor configured to detect an input side operation position of the reduction gear, and an output detection value from an output position detection sensor configured to detect an output side operation position of the reduction gear,
   wherein a detection period of the output side operation position detected by the output position detection sensor is longer than a detection period of the input side operation position detected by the input position detection sensor, and
   wherein the processor is configured to perform the speed control on the arm by using a difference between a delay input detection value and the output detection value, the delay input detection value being an output of the input detection sensor during a delayed detection period.

2. The control device according to claim 1, comprising:
a low pass filter to which the difference between the delay input detection value and the output detection value is input,
wherein the processor is configured to perform the speed control on the arm by using an output of the low pass filter.

3. The control device according to claim 1,
wherein the output position detection sensor includes a camera configured to image the arm, and
wherein the output position detection sensor is configured to detect the output side operation position of the reduction gear based on an output from the camera.

4. The control device according to claim 1,
wherein the output position detection sensor is configured to detect an angular position of an output shaft of the reduction gear which transmits a rotary motion as an output.

5. The control device according to claim 2,
wherein the output position detection sensor is configured to detect an angular position of an output shaft of the reduction gear which transmits a rotary motion as an output.

6. The control device according to claim 1,
wherein a force sensor configured to detect an externally applied force is disposed in the arm, and
wherein the processor is configured to perform the speed control on the arm based on an output of the force sensor.

7. The control device according to claim 2,
wherein a force sensor configured to detect an externally applied force is disposed in the arm, and
wherein the processor is configured to perform the speed control on the arm based on an output of the force sensor.

8. A robot system comprising:
a robot including an arm driven via a reduction gear by a motor generating a drive force, and
a processor configured to execute computer-executable instructions so as to control the robot,
wherein the processor is configured to perform speed control on the arm by using an input detection value from an input position detection sensor configured to detect an input side operation position of the reduction gear, and an output detection value from an output position detection sensor configured to detect an output side operation position of the reduction gear,
wherein a detection period of the output side operation position detected by the output position detection sensor is longer than a detection period of the input side operation position detected by the input position detection sensor, and
wherein the processor is configured to perform the speed control on the arm by using a difference between a delay input detection value and the output detection value, the delay input detection value being an output of the input detection sensor during a delayed detection period.

9. The robot system according to claim 8, comprising:
a low pass filter to which the difference between the delay input detection value and the output detection value is input,
wherein the processor is configured to perform the speed control on the arm by using an output of the low pass filter.

10. The robot system according to claim 8,
wherein the output position detection sensor includes a camera configured to image the arm, and
wherein the output position detection sensor is configured to detect the output side operation position of the reduction gear based on an output from the camera.

11. The robot system according to claim 8,
wherein the output position detection sensor is configured to detect an angular position of an output shaft of the reduction gear which transmits a rotary motion as an output.

12. The robot system according to claim 9,
wherein the output position detection sensor is configured to detect an angular position of an output shaft of the reduction gear which transmits a rotary motion as an output.

13. The robot system according to claim 8,
wherein a force sensor configured to detect an externally applied force is disposed in the arm, and
wherein the processor is configured to perform the speed control on the arm based on an output of the force sensor.

14. The robot system according to claim 9,
wherein a force sensor configured to detect an externally applied force is disposed in the arm, and
wherein the processor is configured to perform the speed control on the arm based on an output of the force sensor.

* * * * *